United States Patent Office 3,022,225
Patented Feb. 20, 1962

3,022,225
PROCESS FOR FERMENTING SUGAR-CONTAIN-
ING LIQUIDS WITH YEAST
Pierre Colin, Melle, Deux-Sevres, France, assignor to
Les Usines de Melle (Societe Anonyme), a corporation
of France
No Drawing. Filed June 17, 1960, Ser. No. 36,709
Claims priority, application France May 19, 1960
10 Claims. (Cl. 195—37)

This invention relates to fermenting sugar-containing liquids to produce ethyl alcohol.

The principal object of the invention is to provide a simple, efficient process of the kind described, which shall produce increased yields of ethyl alcohol.

The invention accordingly comprises the novel processes and steps of processes, specific embodiments of which are described hereinafter by way of example and in accordance with which I now prefer to practice the invention.

In carrying out the invention I ferment by means of yeast a sugar-containing liquid in the presence of a monohydric saturated aliphatic alcohol. The alcohol contains at least 6 carbon atoms and may consist of one such alcohol or a mixture of such alcohols. The alcohol is present during the fermentation process and is usually added at the commencement thereof. Aside from the presence of this alcohol the fermentation of the sugar is conducted in the usual manner, and is preferably conducted using the so-called "yeast recovery process" as set forth in U.S. Patent No. 2,054,736. The sugar-containing liquids employed are those commonly employed in fermentation of sugars to ethyl alcohol, more particularly liquids containing sucrose or similar disaccharide.

In accordance with the invention there may be used straight-chain alcohols, such as n-hexanol or n-heptanol, or branched-chain alcohols, such as 2:ethylbutanol or 2:ethylhexanol. A mixture of such alcohols which may be employed is a mixture of monohydric saturated aliphatic alcohols consisting mostly of $C_7C_8C_9$ or of $C_{10}$ alcohols produced by the "Oxo" synthesis. This well-known synthesis consists in reacting carbon monoxide and hydrogen with an olefine or olefine mixture, in the presence of a carbonyl-forming metal catalyst, thus producing carbonyl compounds having one more carbon atom than the starting olefine molecules, then the carbonyl compounds are hydrogenated to the corresponding alcohol or alcohols.

The $C_7C_8C_9$ alcohols mixture and the $C_{10}$ alcohols mixture mentioned above are produced by the "Oxo" synthesis starting from an olefinic mixture containing $C_6$, $C_7$ and $C_8$ olefines, or a mixture of $C_9$ olefines, respectively.

Such alcohols mixtures are referred to in Table I below.

Another mixture which may economically be used and which contains alcohols of the kind described, besides other substances, is an alcoholic fraction recovered during distillation of the raw 2:ethylhexanol produced by the conventional process of hydrogenating ethyl propyl acrolein. This fraction is liquid, water-soluble, distills above 95° C. under an absolute pressure of 15 mm. mercury, and has an average specific weight of 0.850. It contains mainly decanols and minor proportions of dodecanols and higher alcohols. It is referred to in Example 2 below as "alcohol fraction containing decanols, dodecanols and higher alcohols."

It has been found that the above-described alcohols and mixtures containing such alcohols are highly favorable adjuvants or assistants for alcoholic fermentation of sugar-containing liquids. The proportion to be employed of said assistants is generally low. Such assistants amazingly produce an increase in the fermentation yield (that is, the amount of alcohol produced per 100 parts of sugar put into operation), which increase generally varies from 1.5% to 5% according to the fermentation medium (for example, sugar-beet musts seem to provide the greatest increases), or the fermentation conditions.

In accordance with the present invention the alcohols employed as fermentation assistants are used preferably in proportion of 0.1–0.5 part by volume per one thousand parts by volume of sugar-containing liquid undergoing fermentation. For example, for sugar-beet musts the optimum proportions are 0.1–0.5 per one thousand, but a proportion as high as 1.5 parts by volume per one thousand does not impede the fermentation work. For mollasses-musts, the optimum proportions are 0.1–0.15 per one thousand. Generally, it is preferred that the alcohol or alcoholic mixture constituting the assistant be introduced into the fermentation apparatus together with the sugar-containing liquid to be fermented.

The following examples are illustrative of the manner in which I now prefer to carry out the invention. These examples are illustrative, as stated, and the invention is not to be considered as restricted thereto except as indicated in the appended claims.

EXAMPLE 1

There were performed two parallel, laboratory-scale sets of alcoholic fermentation operations using a sugar-beet must, one of the operations being a blank one, carried out without addition of an alcoholic assistant, while the other was performed in the presence of an alcoholic assistant in accordance with the invention. The quantities of ingredients are specified in the table below:

*Table 1*

| Sugar Liquid | Yeast | Additive | Proportion of Additive Used (parts by volume per 1,000 parts of Must) | Ethyl Alcohol Yield, Kg. | Ethyl Alcohol Yield, percent of sugar | Alcohol Yield Increase, percent |
|---|---|---|---|---|---|---|
| 0.75 litres sugar-beet must | 0.008 kilos containing 75% water. | None | None | 0.0485 | 50 | |
| Do | do | n-hexanol | 0.3 | 0.0497 | 51.25 | 2.5 |
| Do | do | 2:ethylbutanol | 0.5 | 0.0504 | 52 | 4 |
| Do | do | n-heptanol | 0.5 | 0.0499 | 51.5 | 3 |
| Do | do | 2:ethylhexanol | 0.5 | 0.0509 | 52.5 | 5 |
| Do | do | n-nonanol | 0.1 | 0.0498 | 51.5 | 3 |
| Do | do | $C_7C_8C_9$ alcohols mixture produced by the "Oxo" synthesis as above stated. | 0.5 | 0.0507 | 52.3 | 4.5 |
| Do | do | $C_{10}$ alcohols mixture produced by the "Oxo" synthesis as above stated. | 0.5 | 0.0498 | 51.5 | 3 |

EXAMPLE 2

There were performed as in Example 1, two parallel sets of alcoholic fermentation operations using sugar-containing musts, one of the operations being a blank one. These operations were carried out on an industrial scale, using the so-called "yeast recovery process," i.e., a process in which the yeast which has been used in a fermentation operation is recovered and reused in a further similar operation, as described in the above-mentioned Patent 2,054,736.

The operating conditions and resulting yield increase figures are given in the following table:

*Table II*

| Sugar-Liquid (per day) | Yeast | Additive | Proportion of Additive Used (parts by volume per 1,000 parts of Must) | Ethyl Alcohol Yield, Kg. per day | Ethyl Alcohol Yield, percent of sugar | Alcohol Yield Increase, percent |
|---|---|---|---|---|---|---|
| 1,000,000 litres sugar-beet must | 80,000 kilos containing 85% water. | None | None | 55,360 | 49.9 | |
| Do | do | 2-ethylhexanol | 0.4 | 56,960 | 51.4 | 3 |
| Do | do | Alcohol fraction containing decanols, dodecanols and higher alcohols prepared as above stated. | 0.5 | 56,430 | 50.9 | 2 |
| 1,000 litres Molasses Must | 100 kilos containing 87% water. | None | None | 68.0 | 50.4 | |
| Do | do | The same alcohol fraction as above. | 0.1 | 69.1 | 51.2 | 1.6 |

Ethyl alcohol obtained in accordance with the two examples above, is separated in the usual manner by distillation from the fermented mass.

The foregoing examples illustrate the use of beet-musts and of molasses-musts, which are most often employed in industry, but it is within the scope of the present invention to use other kinds of musts containing fermentable sugars.

I claim:

1. A process for producing ethyl alcohol, which comprises fermenting a sugar-containing liquid with yeast in the presence of about 0.1 to 1.5 volumes per one thousand volumes of said sugar-containing liquid of a primary alkyl alcohol containing 6 to 12 carbon atoms.

2. A process for producing ethyl alcohol, which comprises fermenting a disaccharide-containing liquid with yeast in the presence of about 0.1 to 1.5 volumes per one thousand volumes of said disaccharide-containing liquid of a primary alkyl alcohol containing 6 to 12 carbon atoms.

3. A process in accordance with claim 2, in which said primary alkyl alcohol is n-hexanol.

4. A process in accordance with claim 2, in which said primary alkyl alcohol is n-heptanol.

5. A process in accordance with claim 2, in which said primary alkyl alcohol is 2:ethylbutanol.

6. A process in accordance with claim 2, in which said primary alkyl alcohol is 2:ethylhexanol.

7. A process for producing ethyl alcohol, which comprises fermenting a disaccharide-containing liquid with yeast in the presence of about 0.1 to 1.5 volumes per one thousand volumes of said disaccharide-containing liquid of a mixture of primary alkyl alcohols containing decanols and dodecanols.

8. A process for producing ethyl alcohol, which comprises fermenting a disaccharide-containing liquid with yeast in the presence of about 0.1 to 1.5 volumes per one thousand volumes of said disaccharide-containing liquid of a mixture of $C_7$–$C_8$–$C_9$– and $C_{10}$ primary alkyl alcohols.

9. A process as set forth in claim 2 wherein the disaccharide-containing liquid is a sugar beet must.

10. A process as set forth in claim 2 wherein the disaccharide-containing liquid is a molasses must.

References Cited in the file of this patent

UNITED STATES PATENTS 2,053,770    Dreyfus    Sept. 8, 1936